(12) United States Patent
Aravind (10) Patent No.: US 8,498,073 B2
(45) Date of Patent: Jul. 30, 2013

(54) SYSTEMS AND METHODS FOR ADAPTIVE BASELINE COMPENSATION

(75) Inventor: Nayak Ratnakar Aravind, Lancaster, PA (US)

(73) Assignee: Agere-010200US, Allentown, PA (US)

( * ) Notice: Subject to any disclaimer, the term of this patent is extended or adjusted under 35 U.S.C. 154(b) by 65 days.

(21) Appl. No.: 12/992,929

(22) PCT Filed: Feb. 10, 2009

(86) PCT No.: PCT/US2009/033680
§ 371 (c)(1),
(2), (4) Date: Nov. 16, 2010

(87) PCT Pub. No.: WO2010/093355
PCT Pub. Date: Aug. 19, 2010

(65) Prior Publication Data
US 2012/0019946 A1     Jan. 26, 2012

(51) Int. Cl.
*G11B 5/09* (2006.01)
(52) U.S. Cl.
USPC .............................. 360/39; 360/46
(58) Field of Classification Search
None
See application file for complete search history.

(56) References Cited

U.S. PATENT DOCUMENTS

| | | | |
|---|---|---|---|
| 5,465,272 A * | 11/1995 | Smith | 375/295 |
| 6,091,560 A | 7/2000 | Du | |
| 7,009,792 B2 | 3/2006 | Sakai et al. | |
| 7,262,928 B1 | 8/2007 | Oberg | |
| 7,308,057 B1 | 12/2007 | Patapoutian | |
| 2002/0159350 A1 | 10/2002 | Ogura et al. | |
| 2004/0076245 A1 | 4/2004 | Okamoto et al. | |
| 2006/0061496 A1 | 3/2006 | Stein et al. | |
| 2008/0159415 A1 | 7/2008 | Miller et al. | |
| 2009/0002862 A1 | 1/2009 | Park et al. | |
| 2010/0073798 A1* | 3/2010 | Cao | 360/46 |

FOREIGN PATENT DOCUMENTS

WO   WO 2010/093355   8/2010

OTHER PUBLICATIONS

Bergmans, J.W.M. "Digital Baseband Transmission and Recording" Springer, Oct. 31, 1996, Chapter 8.
Brown, James E.G. "A 35 Mb/s Mixed-Signal Decision-Feedback Equalizer for Disk Drives in 2-um CMOS" IEEE vol. 31, No. 9, Sep. 1996.
Madden, Michael "Read Channel for Perpendicular Magnetic Recording" IEEE Transactions on Magnetics, vol. 40 No. 1, Jan. 2004.

* cited by examiner

Primary Examiner — Regina N Holder
(74) Attorney, Agent, or Firm — Hamilton DeSanctis & Cha (57) ABSTRACT

Various embodiments of the present invention provide systems and methods for reducing low frequency loss in a magnetic storage device. For example, some embodiments provide data processing circuits that include: an input circuit, a processing circuit, a data detection circuit, and a baseline compensation circuit. The input circuit receives a first data input and provides a second data input. The input circuit excludes low frequency energy exhibited in the first data input from the second data input. The processing circuit generates a representation of the second data input, and the data detection circuit generates a representation of the first data input based at least in part on the representation of the second data input. The baseline compensation circuit calculates an accumulated difference between the representation of the first data input and the representation of the second data input across a number of bit periods, and calculates a compensation factor based at least in part on the accumulated difference.

20 Claims, 6 Drawing Sheets

SYSTEMS AND METHODS FOR ADAPTIVE BASELINE COMPENSATION

BACKGROUND OF THE INVENTION

The present inventions are related to systems and methods for transferring information, and more particularly to systems and methods for transferring information from a storage medium.

In a traditional storage device, information is longitudinally recorded on a magnetic storage medium. In a longitudinal recording scenario, data detection processes key on data transitions. As such, low frequency components (including any DC component) of the signal sensed from the magnetic storage medium does not convey information and may be eliminated. In addition, there is a desire to provide a high pass filter in a preamplifier associated with a data detection system to allow for fast write to read recovery.

In contrast to longitudinal recording where data detection keys on transitions, in newer perpendicular recording scenarios the magnitude of the field sensed from the magnetic storage medium carries information. In such a case, use of a high pass filter likely eliminates some information sensed from the magnetic storage medium. In addition, as disk format efficiency demands low coding overhead, the capability to provide for detecting low frequency components by means of RLL encoding is limited. In some cases, the aforementioned loss of low frequency energy has resulted in a lower signal to noise ratio in devices using perpendicular recording approaches. Prior data detection systems included the use of an error feedback signal derived from the detected bits to drive a spectrum mismatch compensation circuit. Such an approach may be used to preserve lower frequency information eliminated by the high pass filter, however, such an approach relies on DC and low frequency energy derived from detected data bits to drive the feedback error signal. In such an approach, latency becomes a major concern and ultimately limits any ability to obtain DC and low frequency energy.

Hence, for at least the aforementioned reasons, there exists a need in the art for advanced systems and methods for accessing information from a storage medium.

BRIEF SUMMARY OF THE INVENTION

The present inventions are related to systems and methods for transferring information, and more particularly to systems and methods for transferring information from a storage medium.

Various embodiments of the present invention provide data processing systems that include: a preamplifier, an analog to digital converter, a data detector, and a baseline compensation module. The preamplifier receives an input signal derived from a storage medium, and amplifies the input signal to generate an amplified signal. The amplified signal does not include some low frequency energy exhibited in the input signal. The system further includes an analog to digital converter that converts the amplified signal to a corresponding digital signal. The digital signal is provided to a data detector that implements a detection algorithm resulting in a detected data output. The detected data output represents the input signal. A baseline compensation module accumulates a difference between the digital signal and the detected data output, and calculates a compensation factor based on the accumulated difference. A summation element aggregates the compensation factor with the amplified signal.

In some instances of the aforementioned embodiments, the digital signal is filtered using a digital finite impulse response filter. In various instances of the aforementioned embodiments, the accumulated difference is accumulated by dividing the difference for each respective bit period divided by the detected data output for the respective bit period, and adding the product of the division across a number of bit periods. In some cases, the number of bit periods corresponds to the number of bit periods of a sector of the storage medium. In some instances of the aforementioned embodiments, the accumulated difference is accumulated by dividing the difference for each respective bit period by the detected data output for the respective bit period, and adding the product of the division across a number of bit periods. In various instances of the aforementioned embodiments, the accumulated difference is accumulated by multiplying the difference for each respective bit period by the sign of the detected data output for the respective bit period, and adding the product of the division across a number of bit periods. In some cases, the accumulated difference does not include the product of a multiplication where the magnitude of the detected data output is less than a threshold value for a respective bit period.

Other embodiments of the present invention provide methods for performing a baseline compensation. The methods include receiving a first analog input signal. The first analog input signal corresponds to a second analog input signal that has been high pass filtered. The first analog input signal is converted to a digital signal, and a data detection is performed on the digital signal to provide a detected data output. A difference between the digital signal and the detected data output is calculated, and the difference is aggregated with an accumulated difference to create a difference accumulation. A pole of a low pass filter is modified using the difference accumulation. In some instances of the aforementioned embodiments, the methods further include aggregating an output derived from the low pass filter with the first analog input such that low frequency energy removed from the first analog input is restored.

In various instances of the aforementioned embodiments, the difference is calculated by subtracting the digital signal from the detected data output and dividing the result by the detected data output. In some cases, the difference is calculated by subtracting the digital signal from the detected data output and multiplying the result by the sign detected data output. In particular cases, the result is only incorporated in the accumulation when the magnitude of the detected data output exceeds a threshold. In one or more cases, the difference accumulation is multiplied by a damping factor to create a damped difference factor, and modifying the pole of the low pass filter is done using the damped difference factor.

Yet other embodiments of the present invention provide data processing circuit that include, an input circuit, a processing circuit, a data detection circuit, and a baseline compensation circuit. The input circuit receives a first data input and provides a second data input. The input circuit excludes low frequency energy exhibited in the first data input from the second data input. The processing circuit generates a representation of the second data input, and the data detection circuit generates a representation of the first data input based at least in part on the representation of the second data input. The baseline compensation circuit calculates an accumulated difference between the representation of the first data input and the representation of the second data input across a number of bit periods, and calculates a compensation factor based at least in part on the accumulated difference.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for transferring information, and more particularly to systems and methods for transferring information from a storage medium.

Various embodiments of the present invention provide for baseline compensation in a read channel circuit. In some cases, the adaptive nature of the baseline compensation obviates the need to know the actual pole location of a preamplifier in a data detection circuit. In various implementations, the pole location for the preamplifier in the data detection circuit is generally known, but varies from chip to chip, or system to system. Various embodiments of the present invention allows for automated reduction or elimination of any error between the generally known pole location and the actual pole location. As such, data detection performance is improved. In some cases, the adaptive baseline compensation relies upon an upstream detector output and detector error to generate a compensation estimate. In some cases, any baseline compensation is only updated once per sector and may be further limited by a damping factor. Such a limit avoids undesirable correction oscillation.

Figure 1A:
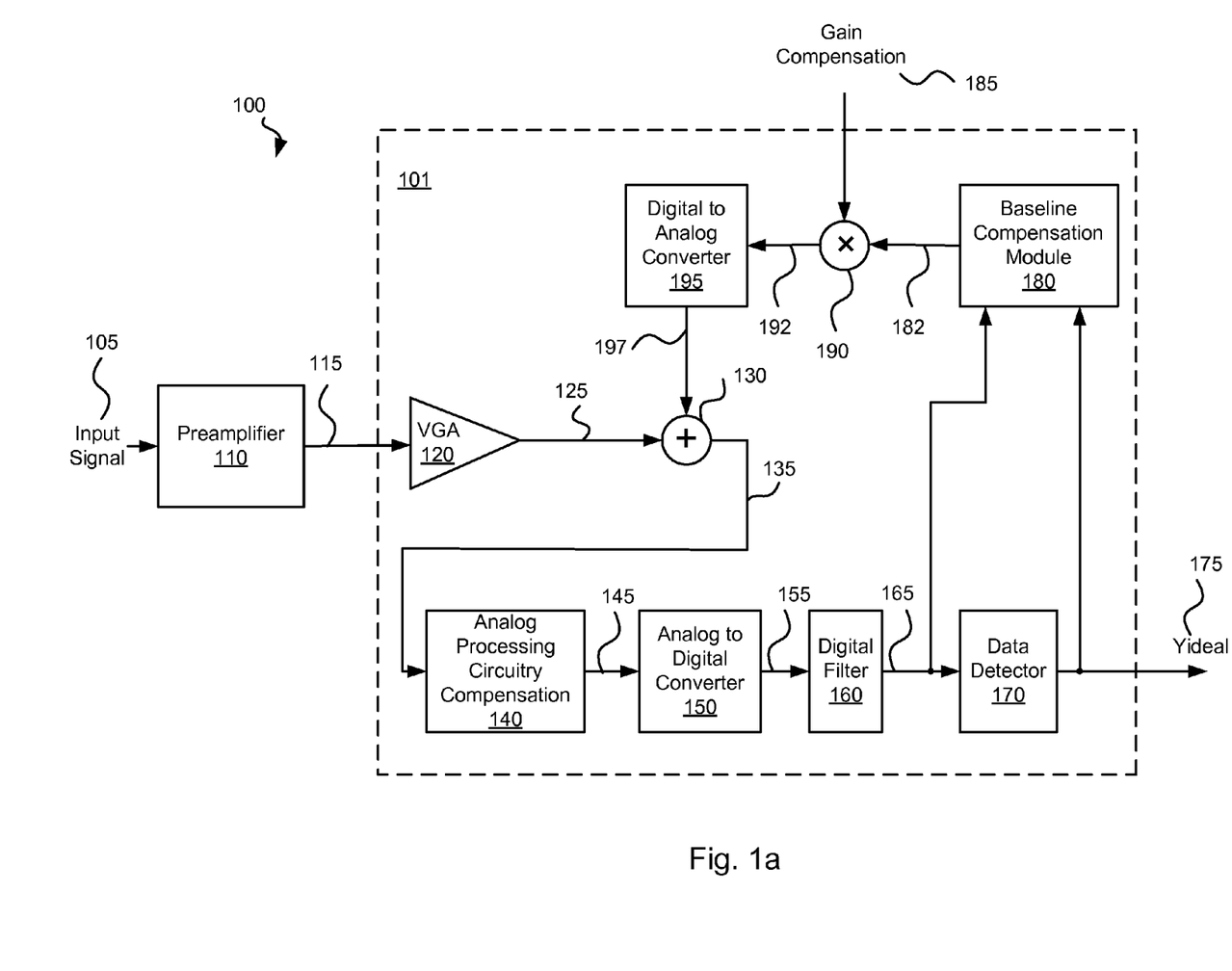
FIG. 1a depicts a data detection system including adaptive baseline compensation in accordance with one or more embodiments of the present invention.

Turning to FIG. 1a, a data detection system 100 including adaptive baseline compensation is shown in accordance with one or more embodiments of the present invention. Data detection system 100 includes a preamplifier 110 and a read channel circuit 101. Preamplifier 110 receives an input signal 105 and provides an amplified signal 115. Preamplifier 110 may be any amplification circuit known in the art that is capable of receiving a signal and providing a corresponding amplified signal. Based upon the disclosure provided herein, one of ordinary skill in the art will recognize a variety of amplification circuits that may be used in relation to different embodiments of the present invention. In some cases, input signal 105 is a minute analog signal received from a read/write head assembly (not shown) that is disposed in relation to a magnetic storage medium (not shown). The minute amplified signal represents information that was previously stored to the magnetic storage medium. Based upon the disclosure provided herein, one of ordinary skill in the art will recognize a variety of sources for input signal 105.

In various situations, preamplifier 110 performs a high pass filter function eliminating some of low frequency information. Where this low frequency information is needed, read channel circuit 101 operates to re-inject the low frequency information by performing an adaptive baseline compensation. Read channel circuit 101 includes a variable gain amplifier 120 that receives amplified signal 115. Variable gain amplifier 120 may be any variable gain amplifier known in the art, and one of ordinary skill in the art will appreciate different variable gain amplifiers that will be appropriate for use in relation to one or more embodiments of the present invention. Variable gain amplifier 120 provides a gain adjusted input 125. Gain adjusted input 125 is provided to an analog summation circuit 130 that operates to add a baseline correction factor 197, and to provide the aggregate signal 135. In one particular embodiment of the present invention, analog summation circuit 135 is an electrical connection. Based upon the disclosure provided herein, one of ordinary skill in the art will recognize various analog summation circuits that may be used in relation to different embodiments of the present invention. Of note, as further discussed below, baseline correction factor 197 is an estimate of the low frequency energy originally included in input signal 105, but removed from amplified signal 115 by preamplifier. By re-injecting the low frequency energy via baseline correction factor 197, any DC buildup in the signal is limited assuring that the signal that is ultimately presented to an analog to digital converter 150 is centered within the range of analog to digital converter 150. This avoids operating analog to digital converter 150 in the saturation region, and thereby assures that a more accurate digital sampling of the received data is possible. As such, the effect of the high pass filter function of preamplifier 110 is mitigated by injecting baseline correction factor 197 via analog summation circuit 135.

Aggregate signal 135 is provided to analog processing circuitry that produces a processed analog input 145 to an analog to digital converter 150. Analog processing circuitry may perform one or more analog compensation processes as are known in the art. For example, analog processing circuitry 140 may include, but is not limited to, a magneto resistive head asymmetry compensation circuit (not shown) as is known in the art and/or an analog filter (not shown) as is also known in the art. Based upon the disclosure provided herein, one of ordinary skill in the art will recognize a variety of analog processing circuitry that may be used in relation to different embodiments of the present invention.

Analog to digital converter 150 samples processed analog input 145 and provides a corresponding series of digital samples 155. Analog to digital converter 150 may be any analog to digital converter known in the art. Digital samples 155 are provided to a digital filter 160. In some cases, digital filter 160 is a digital finite impulse response filter as is known in the art. In one particular case, the digital finite impulse response filter is a ten tap filter. A filtered output 165 representing the received input signal 105 is provided to a data detector 170 that algorithmically determines a proper bit sequence based on the received input. Data detector 170 may be any data detector known in the art. For example, data detector 170 may be, but is not limited to, a Viterbi algorithm data detector or a peak detector. Based on the disclosure provided herein, one of ordinary skill in the art will recognize a variety of data detectors that may be used in relation to different embodiments of the present invention.

Data detector 170 provides an ideal output 175 (sometimes referred to as Yideal) that may be provided to downstream processing circuitry. In addition, ideal output 175 and filtered output 165 are provided to a baseline compensation module 180. Baseline compensation module 180 adaptively mitigates the loss of low frequency energy from amplified signal 115. A compensation output 182 is provided to a multiplier circuit 190 where it is multiplied by a gain compensation factor 185. Gain compensation factor 185 is selected to compensate for any gain introduced into data detection system 100 by analog processing circuitry 140. Thus, for example, where analog processing circuit 140 has a gain of less than unity, gain factor 185 is greater than unity such that the overall gain is approximately unity. The following equation describes the value of gain compensation factor 185:

$$\text{Gain Adjustment Factor } \mathbf{185} = \frac{1}{\text{Loop Gain}}.$$

A gain adjusted compensation output 192 is provided to a digital to analog converter 195. Digital to analog converter 195 may be any digital to analog converter known in the art. Digital to analog converter 195 converts gain adjusted compensation output 192 to compensation factor 197. As discussed above, compensation factor 197 is aggregated with gain adjusted input 125 using analog summation element 130.

Figure 1B:
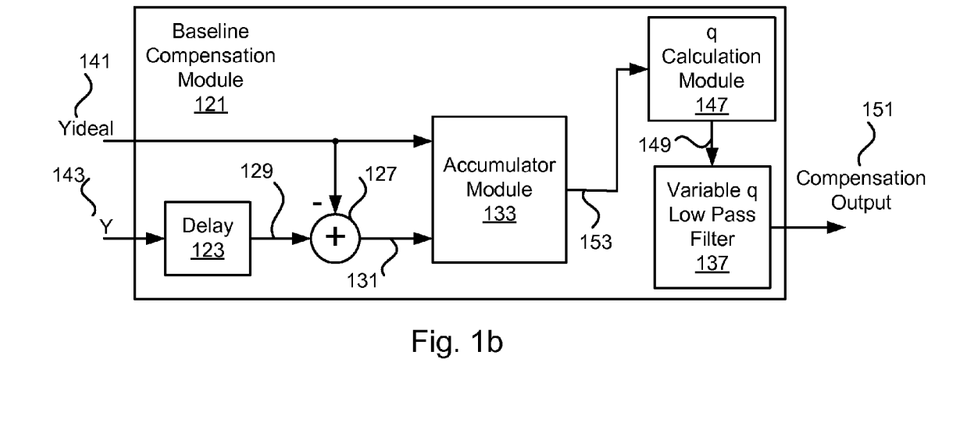
FIG. 1b depicts a baseline compensation module in accordance with various embodiments of the present invention.

Turning to FIG. 1b, a baseline compensation module 121 is shown in accordance with various embodiments of the present invention. Baseline compensation module 121 may be used in place of baseline compensation module 180. Baseline compensation module receives a Yideal input 141 and a Y input 143. Y input 143 is provided to a delay block that delays Y input 143 to align it in time with Yideal output 141. Thus, where Y input 143 corresponds to filtered output 165 and Yideal input 141 corresponds to the output of data detector 170, the delay introduced by delay block 123 by a time period corresponding to the delay through data detector 170.

Yideal input 141 is provided to both a summation element 127 and to an accumulator module 133. Summation element 127 subtracts Yideal 141 from a delayed Y input 129 to create an error signal 131. Error signal 131 is provided to accumulator module 133. Accumulator module 133 performs an accumulation and provides an adjustment 153 in accordance with the following equation:

$$\text{Adjustment } \mathbf{153} = \sum_{i=1}^{L} \frac{Error_i}{Yideal_i},$$

where L is the number of bit periods over which the adjustment is performed. In one particular embodiment of the present invention, L is equivalent to the number of bit periods in a sector of data. In such a case, each adjustment is performed across a single sector of data.

Adjustment 153 is provided to a q calculation module 147. The q calculation module 147 calculates an estimated q-factor 149 corresponding to the pole of a preamplifier or other significant high pass filter in the circuit. Estimated q-factor 149 is provided to a variable q low pass filter 137. Variable q low pass filter 137 provides a compensation output 151. Where baseline compensation module 121 is used in place of baseline compensation module 180, compensation output 151 is provided as compensation output 182.

Figure 2:
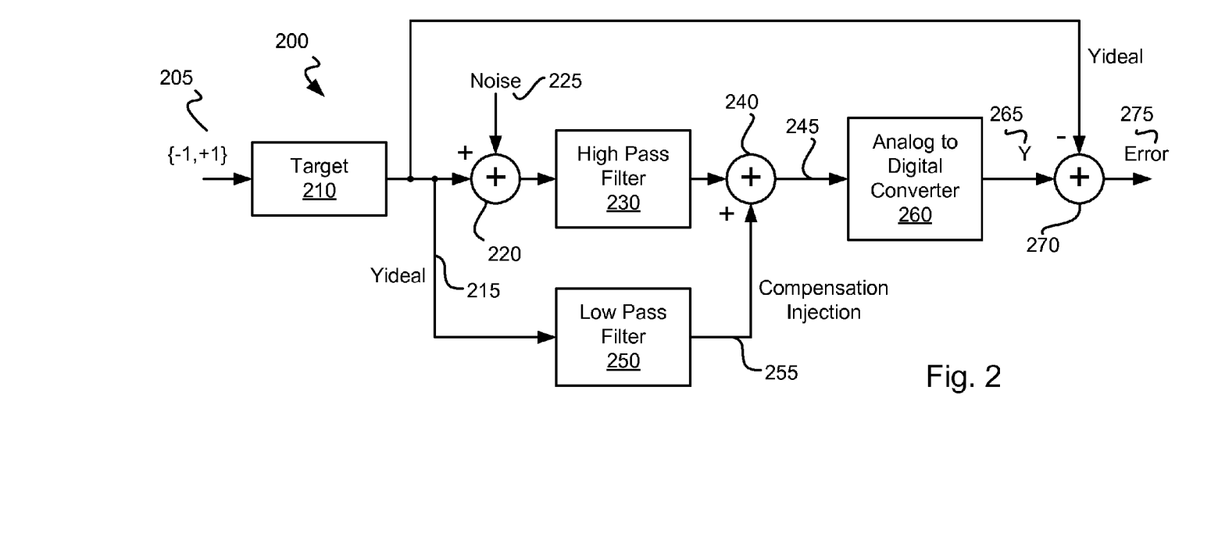
FIG. 2 shows a conceptual model used to describe an adaptive baseline compensation approach in accordance with various embodiments of the present invention.

Turning to FIG. 2, a conceptual model 200 is used to describe an adaptive baseline compensation approach in accordance with various embodiments of the present invention. In some cases, the combination of accumulator module 133 and q calculation module 147 may be implemented in accordance with conceptual module 200. As shown, conceptual model 200 includes a target 210 that receives an input 205. Target 210 provides a Yideal output 215 that is distributed to a summation element 220, a summation element 270, and to a low pass filter 250. Noise 225 is added to Yideal output 215 via summation element 220. An aggregated output 280 is provided from summation element 220 from a high pass filter 230. High pass filter 230 provides a filtered output 285 to a summation element 240. A compensation injection output 255 is provided from low pass filter 255 that is provided to a summation element 240. Summation element 240 adds compensation injection output 255 to filtered output 285 to yield and aggregate output 245. Aggregate output 245 is provided to an analog to digital converter 260 that generates a corresponding Y output 265. Y output 265 is subtracted from Yideal 215 using a summation element 270 to yield an error output 275.

Conceptually, whatever low frequency energy that is removed from Yideal 215 by high pass filter 230 is isolated by low pass filter 250 and added back in as compensation injection 255. In this case, high pass filter 230 is analogous to any circuitry operating as a high pass filter. Thus, in the case of data detection system 100, high pass filter 230 is analogous to preamplifier 110. Similarly, low pass filter 250 is analogous to the circuitry used to provide compensation injection back into the data path. Thus, in the case of data detection system 100, low pass filter 250 is analogous to the combination of baseline compensation module 180, multiplier 190 and digital to analog converter 195. Yideal 215 corresponds to Yideal 141, an error output 275 is analogous to error signal 131, and filtered output 165 corresponds to Y output 265.

The pole of high pass filter 230 is modeled by the following equation:

$$q = e^{-2\pi fT},$$

where f is the center frequency of high pass filter. Using this, high pass filter 230 may be modeled as:

$$\text{High Pass Filter } \mathbf{230} = \frac{1+q}{2} * \frac{1-z^{-1}}{1-qz^{-1}}.$$

Low pass filter 250 may be similarly modeled where q is replaced by $\tilde{q}$:

$$\text{Low Pass Filter } \mathbf{250} = \frac{1-\tilde{q}}{2} * \frac{1+z^{-1}}{1-\tilde{q}z^{-1}}.$$

The value of q̃ is adaptively calculated to cancel the pole of high pass filter 230. Using the aforementioned mathematical models for low pass filter 250 and high pass filter 230, and assuming no noise 225, the following equation represents the ratio of error output 275 to Yideal 215:

$$\frac{\text{Error Output 275}}{\text{Yideal 215}} = \frac{q-\tilde{q}}{2} * \frac{1-z^{-2}}{(1-qz^{-1})(1-\tilde{q}z^{-1})}, \text{ or}$$

$$\frac{\text{Error Output 275}}{\text{Yideal 215}} = \frac{q-\tilde{q}}{2} * H(z), \text{ where } H(z) = \frac{1-z^{-2}}{(1-qz^{-1})(1-\tilde{q}z^{-1})}.$$

H(z) represents a band pass filter with its peak response very close to DC. Accumulating the ratios of samples of $$\frac{\text{Error Output 275}}{\text{Yideal 215}}$$

is equivalent to multiplying the band pass filter response, H(z), with a low pass filter response, L(z). The accumulated ratio therefore represents value that is proportional to any error in the estimate of q for low pass filter 250 (i.e., q̃). This error value can be driven to zero by driving q̃ to q.

Now, referring back to FIG. 1b, operation of the combination of accumulator module 133 and q calculation module 147 can be described. In particular, accumulator module 133 calculates the ratio of $$\frac{\text{Error Signal 131}}{\text{Yideal 141}}$$

across a number of samples to provide adjustment 153. In one particular embodiment of the present invention, the number of samples corresponds to the number of bit periods in a sector of data on a magnetic storage medium. Based upon the disclosure provided herein, one of ordinary skill in the art will recognize different numbers of samples that may be used in accordance with different embodiments of the present invention. This accumulation is represented as:

$$\text{Adjustment 153} = \sum_{i=1}^{L} \frac{\text{Error}_i}{\text{Yideal}_i}.$$

Consistent with the discussion of conceptual model 200, adjustment 153 is proportional to the error in the q of variable q low pass filter 137. From this equation, q calculation module 147 can calculate an updated q value (i.e., q̃) that is provided to variable q low pass filter 137.

Some embodiments of the present invention simplify the circuitry of baseline compensation module 121 by using only the sign of Yideal 141. In such cases, the value of adjustment 153 is calculated in accordance with the following equation:

$$\text{Adjustment 153} = \sum_{i=1}^{L} \frac{\text{Error}_i}{\text{Sign}(\text{Yideal}_i)}.$$

Accordingly, the error in q implemented by variable q low pass filter 137 may be represented by the following equation:

$$\text{Adjustment 153} = qe_k = \sum_{i=0}^{L-1} e_i^k \text{sign}(y_{ideal,i}^k),$$

where k represents the region over which the summation is performed, i represents individual samples within the region, and L is the number of samples in the region. In one particular embodiment of the present invention, k is a sector number, i is a bit period within a sector, and L is the number of bit periods within the sector. Thus, as an example, $e_i^k$ is the error associated with the $i^{th}$ bit period in the $k^{th}$ sector. From this, the value of q calculated by q calculation module 147 and provided to variable q low pass filter 137 is yielded by the following equation:

$$\tilde{q}e_{k+1} = \tilde{q}e_k + \mu qe_k,$$

where $\tilde{q}e_{k+1}$ is the value provided to variable q low pass filter 137 for a succeeding period, $\tilde{q}e_k$ is the value that was provided to variable q low pass filter 137 during a preceding period, and µ is a damping factor that may be programmed depending upon the amount of correction that will be allowed at any point. Where the damping factor is very large, it will take considerable time to adjust the q of variable q low pass filter 137 and won't exhibit much if any overshoot. In contrast, where the damping factor is very low, it will take less time to adjust the q of variable q low pass filter 137, but may exhibit some oscillation. Based upon the disclosure provided herein, one of ordinary skill in the art will recognize a variety of values for µ that may be used depending upon particular design constraints. Where k represents a sector, the value of q̃e provided to variable q low pass filter 137 is adjusted at the end of each sector of data.

In some cases, a multi-level quantization filter may be used to avoid the situation where a small magnitude Yideal 141 of one polarity effectively offsets a large magnitude Yideal 141 of the opposite polarity. For example, where the magnitude of Yideal 141 is below a certain threshold, it is considered a zero value. Where the magnitude exceeds the certain threshold, the sign of Yideal 141 is used in the accumulation. The following pseudo-code describes the filtering process:

```
initialize adjustment 153 to zero;
for (i=1 to n){
    If( y_ideal,i^k > Threshold){
        adjustment 153 = adjustment 153 + e_i^k sign(y_ideal,i^k) ;
    }
    Else if ( y_ideal,i^k <= Threshold){
        adjustment 153 = adjustment 153;
    }
}.
```

Figure 3A:
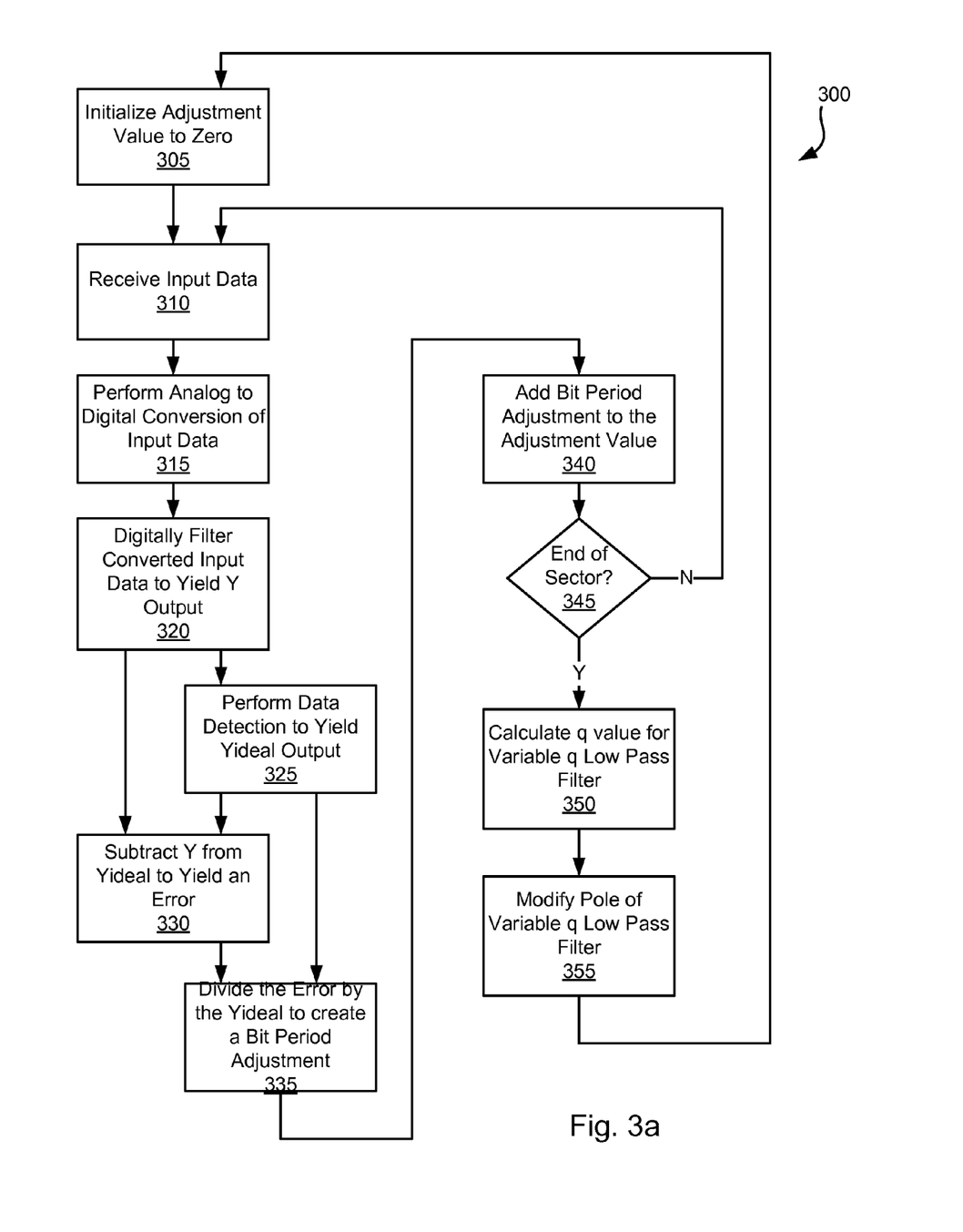
FIG. 3a depicts a flow diagram showing a method for performing baseline compensation in a data detection system in accordance with some embodiments of the present invention.

FIG. 3a depicts a flow diagram 300 showing a method for performing baseline compensation in a data detection system in accordance with some embodiments of the present invention. Following flow diagram 300, an adjustment value is initialized to zero (block 305). This adjustment value forms the basis of a modification to a variable q low pass filter that is used to re-inject low frequency energy eliminated by a high pass filter function of a data processing circuit. A data input is received (block 310). This data input may be, for example, an analog input signal derived from a magnetic storage medium.

An analog to digital conversion is performed on the data input that creates one or more digital samples corresponding thereto (block 315).

The digital samples are digitally filtered to create a Y output (block 320). In some cases, the digital filtering is done using a digital finite impulse response filter as are known in the art. The filtered output is then passed to a data detector that applies a data detection algorithm to the filtered data and provides a Yideal output (block 325). The data detection process may be performed using any data detector/decoder known in the art. The Y output is subtracted from the Yideal output to create an error or difference (block 330), and the error is divided by the Yideal output (block 335). The product of dividing the error by the Yideal output is referred to as a bit period adjustment. The bit period adjustment is added to the accumulating adjustment value (block 340).

It is determined whether the end of the sector has been reached (block 345). Where the end of the sector has not been reached (block 345), the processes of blocks 310 through 345 are repeated for the subsequent bit period. Alternatively, where the end of the sector has been reached (block 345), the adjustment value corresponds to the following equation:

$$\text{Adjustment} = \sum_{i=1}^{L} \frac{Error_i}{Yideal_i},$$

where L is the number of bit periods in a given sector. This Adjustment value is then used to calculate an updated pole for a variable q low pass filter (block 350) in accordance with the following equation:

$$\tilde{q}e_{k+1} = \tilde{q}e_k + \mu \text{Adjustment},$$

where $\tilde{q}e_{k+1}$ is the value provided to the variable q low pass filter for a succeeding period, $\tilde{q}e_k$ is the value that was provided to the variable q low pass filter during a preceding period, and $\mu$ is a damping factor that may be programmed depending upon the amount of correction that will be allowed at any point. This updated value is provided to the variable q low pass filter to modify the pole thereof (block 355). The processes of block 305 through 355 are then repeated for the next sector.

Figure 3B:
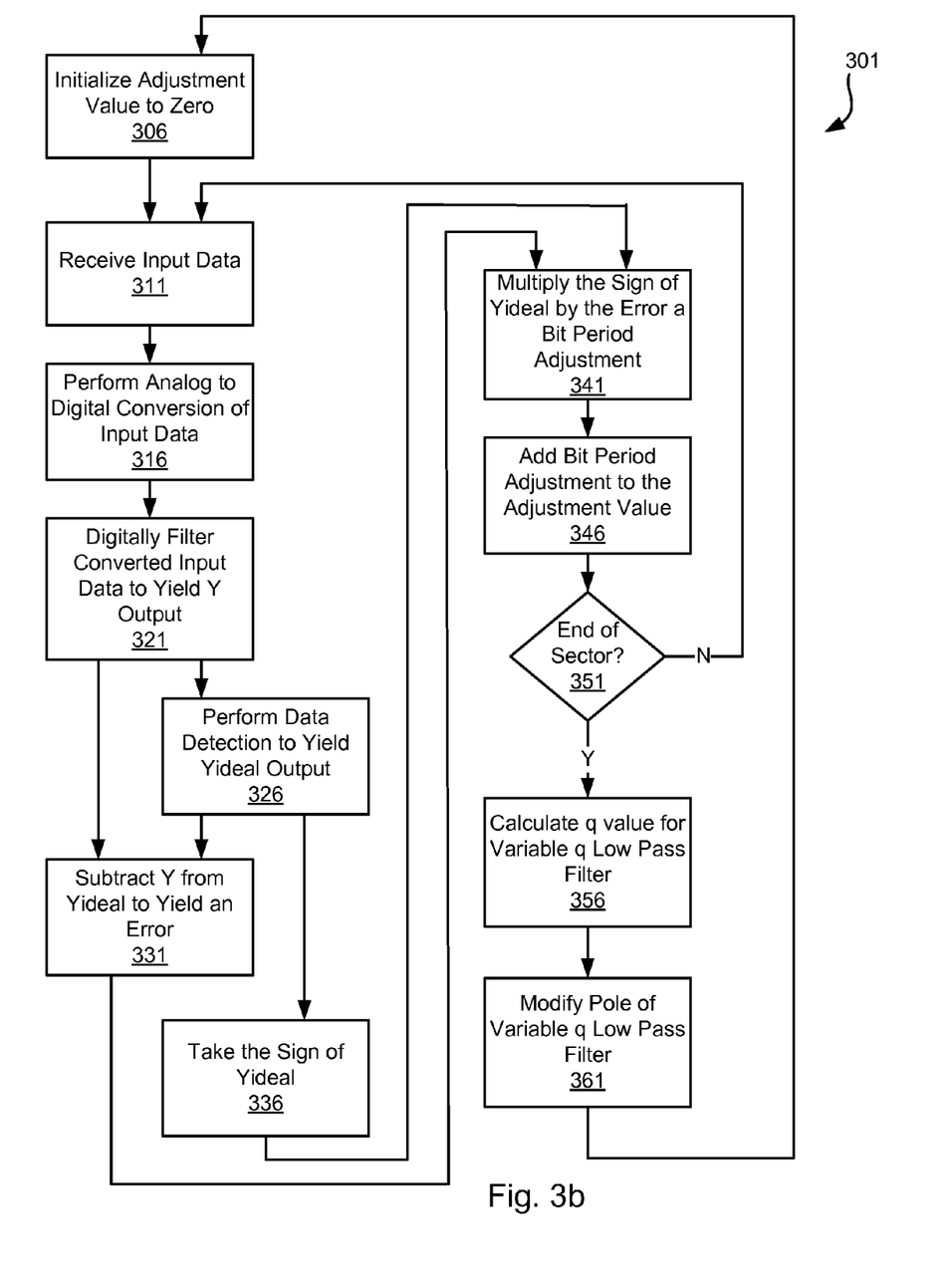
FIG. 3b depicts a flow diagram showing a method for performing baseline compensation in a data detection system in accordance with some embodiments of the present invention.

FIG. 3b depicts a flow diagram 301 showing a method for performing baseline compensation in a data detection system in accordance with some embodiments of the present invention. Following flow diagram 301, an adjustment value is initialized to zero (block 306). This adjustment value forms the basis of a modification to a variable q low pass filter that is used to re-inject low frequency energy eliminated by a high pass filter function of a data processing circuit. A data input is received (block 311). This data input may be, for example, an analog input signal derived from a magnetic storage medium. An analog to digital conversion is performed on the data input that creates one or more digital samples corresponding thereto (block 316).

The digital samples are digitally filtered to create a Y output (block 321). In some cases, the digital filtering is done using a digital finite impulse response filter as are known in the art. The filtered output is then passed to a data detector that applies a data detection algorithm to the filtered data and provides a Yideal output (block 326). The data detection process may be performed using any data detector/decoder known in the art. The Y output is subtracted from the Yideal output to create an error or difference (block 331). In addition, the sign of Yideal is taken (336). The sign of Yideal is then multiplied by the error (block 341). The product of multiplying the error by the sign of Yideal output is referred to as a bit period adjustment. The bit period adjustment is added to the accumulating adjustment value (block 346).

It is determined whether the end of the sector has been reached (block 351). Where the end of the sector has not been reached (block 351), the processes of blocks 311 through 351 are repeated for the subsequent bit period. Alternatively, where the end of the sector has been reached (block 351), the adjustment value corresponds to the following equation:

$$\text{Adjustment} = \sum_{i=1}^{L} Error_i * \text{Sign}(Yideal_i),$$

where L is the number of bit periods in a given sector. This Adjustment value is then used to calculate an updated pole for a variable q low pass filter (block 356) in accordance with the following equation:

$$\tilde{q}e_{k+1} = \tilde{q}e_k + \mu \text{Adjustment},$$

where $\tilde{q}e_{k+1}$ is the value provided to the variable q low pass filter for a succeeding period, $\tilde{q}e_k$ is the value that was provided to the variable q low pass filter during a preceding period, and $\mu$ is a damping factor that may be programmed depending upon the amount of correction that will be allowed at any point. This updated value is provided to the variable q low pass filter to modify the pole thereof (block 361). The processes of block 306 through 361 are then repeated for the next sector.

Figure 3C:
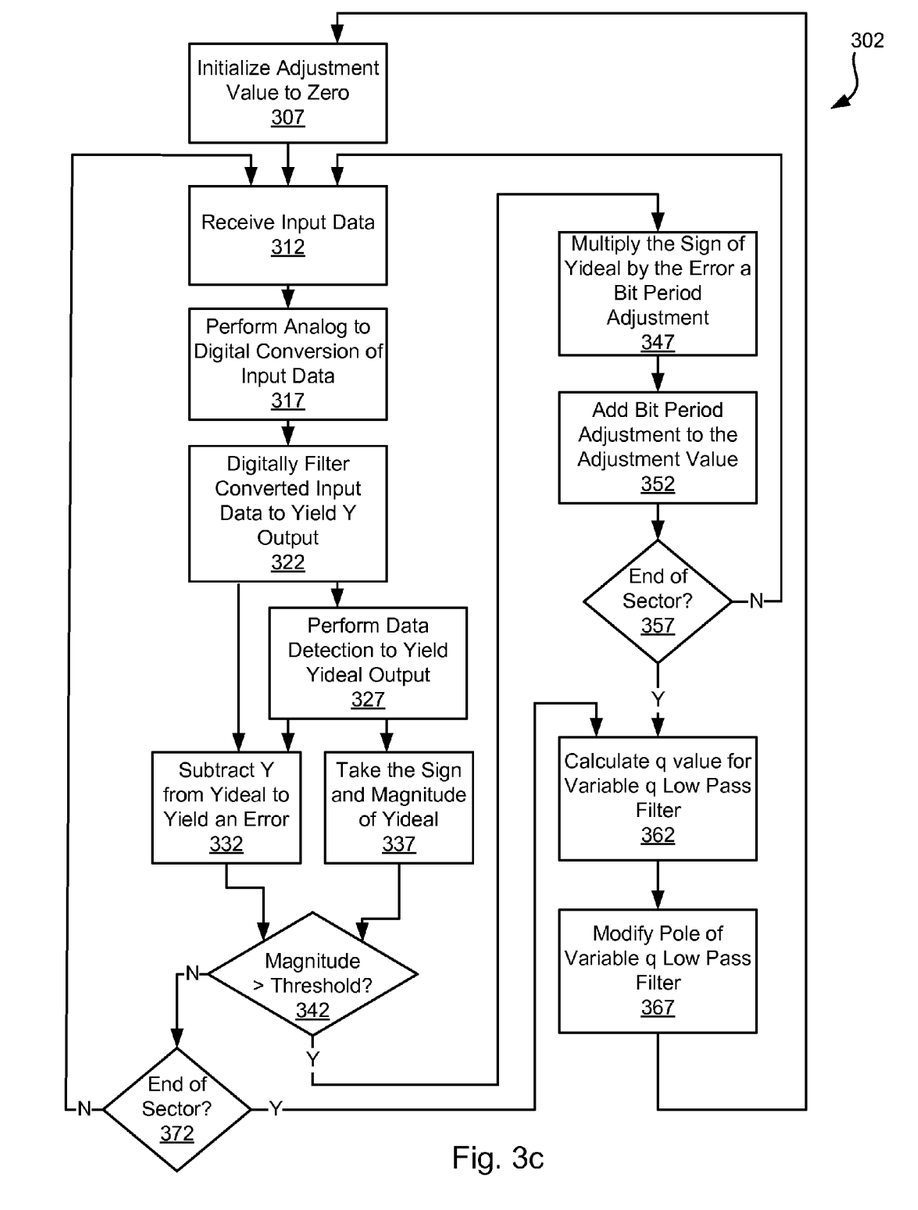
FIG. 3c depicts a flow diagram showing a method for performing baseline compensation in a data detection system in accordance with some embodiments of the present invention.

FIG. 3c depicts a flow diagram 302 showing a method for performing baseline compensation in a data detection system in accordance with some embodiments of the present invention. Following flow diagram 302, an adjustment value is initialized to zero (block 307). This adjustment value forms the basis of a modification to a variable q low pass filter that is used to re-inject low frequency energy eliminated by a high pass filter function of a data processing circuit. A data input is received (block 312). This data input may be, for example, an analog input signal derived from a magnetic storage medium. An analog to digital conversion is performed on the data input that creates one or more digital samples corresponding thereto (block 317).

The digital samples are digitally filtered to create a Y output (block 322). In some cases, the digital filtering is done using a digital finite impulse response filter as are known in the art. The filtered output is then passed to a data detector that applies a data detection algorithm to the filtered data and provides a Yideal output (block 327). The data detection process may be performed using any data detector/decoder known in the art. The Y output is subtracted from the Yideal output to create an error or difference (block 332). In addition, the sign and magnitude of the Yideal output is taken (337). It is then determined whether the magnitude of the Yideal output is greater than a threshold value (block 342) and/or whether the end of the sector has been achieved (block 372). Where the magnitude is not greater than the threshold value (block 342) and the end of the sector has not been reached (block 372), the process is returned to block 312 and blocks 312 through 342 are repeated. Where, on the other hand, the magnitude is not greater than the threshold (block 342) and the end of the sector has been reached (block 372), the process is forwarded to block 362 for completion. At this juncture, the adjustment value corresponds to the following equation:

$$\text{Adjustment} = \sum_{i=1}^{L} \text{Error}_i * \text{Sign}(Yideal_i),$$

where L is the number of bit periods in a given sector, and only components (i.e., $\text{Error}_i*\text{Sign}(Yideal_i)$) where Yideal exceeds the threshold are included.

Alternatively, where the magnitude of Yideal does exceed the threshold (block 372), the sign of Yideal is multiplied by the error (block 347). The product of multiplying the error by the sign of Yideal output is referred to as a bit period adjustment. The bit period adjustment is added to the accumulating adjustment value (block 352). it is determined whether the end of the sector has been reached (block 357). Where the end of the sector has not been reached (block 357), the processes of blocks 312 through 357 are repeated for the subsequent bit period. Alternatively, where the end of the sector has been reached (block 357), the adjustment value corresponds to the following equation:

$$\text{Adjustment} = \sum_{i=1}^{L} \text{Error}_i * \text{Sign}(Yideal_i),$$

where L is the number of bit periods in a given sector, and only components (i.e., $\text{Error}_i*\text{Sign}(Yideal_i)$) where Yideal exceeds the threshold are included. This adjustment value is then used to calculate an updated pole for a variable q low pass filter (block 362) in accordance with the following equation:

$$\tilde{q}e_{k+1} = \tilde{q}e_k + \mu \text{Adjustment},$$

where $\tilde{q}e_{k+1}$ is the value provided to the variable q low pass filter for a succeeding period, $\tilde{q}e_k$ is the value that was provided to the variable q low pass filter during a preceding period, and μ is a damping factor that may be programmed depending upon the amount of correction that will be allowed at any point. This updated value is provided to the variable q low pass filter to modify the pole thereof (block 367). The processes of block 307 through 367 are then repeated for the next sector.

Figure 4:
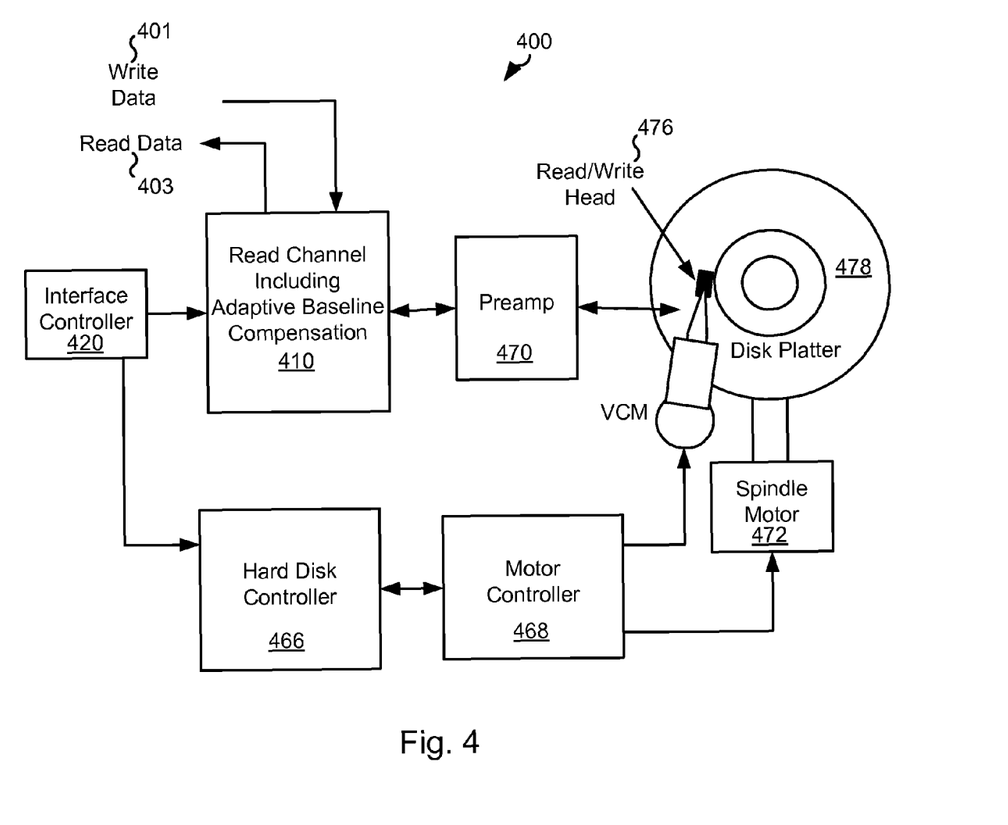
FIG. 4 depicts a storage system including a read channel with adaptive baseline compensation in accordance with various embodiments of the present invention.

Turning to FIG. 4, a storage system 400 including a read channel with adaptive baseline compensation 410 is shown in accordance with various embodiments of the present invention. Storage system 400 may be, for example, a hard disk drive. In addition to baseline compensation, read channel 410 includes a data detector. The incorporated data detector may be any data detector known in the art including, for example, a Viterbi algorithm data detector. Storage system 400 also includes a preamplifier 470, an interface controller 420, a hard disk controller 466, a motor controller 468, a spindle motor 472, a disk platter 478, and a read/write head 476. Interface controller 420 controls addressing and timing of data to/from disk platter 478. The data on disk platter 478 consists of groups of magnetic signals that may be detected by read/write head assembly 476 when the assembly is properly positioned over disk platter 478. In one embodiment, disk platter 478 includes magnetic signals recorded in accordance with a perpendicular recording scheme.

In a typical read operation, read/write head assembly 476 is accurately positioned by motor controller 468 over a desired data track on disk platter 478. Motor controller 468 both positions read/write head assembly 476 in relation to disk platter 478 and drives spindle motor 472 by moving read/write head assembly to the proper data track on disk platter 478 under the direction of hard disk controller 466. Spindle motor 472 spins disk platter 478 at a determined spin rate (RPMs). Once read/write head assembly 478 is positioned adjacent the proper data track, magnetic signals representing data on disk platter 478 are sensed by read/write head assembly 476 as disk platter 478 is rotated by spindle motor 472. The sensed magnetic signals are provided as a continuous, minute analog signal representative of the magnetic data on disk platter 478. This minute analog signal is transferred from read/write head assembly 476 to read channel module 464 via preamplifier 470. Preamplifier 470 is operable to amplify the minute analog signals accessed from disk platter 478. In turn, read channel module 410 decodes and digitizes the received analog signal to recreate the information originally written to disk platter 478. This data is provided as read data 403 to a receiving circuit. As part of decoding the received information, read channel 410 performs an adaptive baseline compensation process. In some cases, read channel 410 includes circuitry similar to that discussed above in relation to FIG. 1. In some cases, the baseline compensation process is performed in accordance with that discussed above in relation to FIG. 2, FIG. 3a, FIG. 3b, and/or FIG. 3c. A write operation is substantially the opposite of the preceding read operation with write data 401 being provided to read channel module 410. This data is then encoded and written to disk platter 478.

In conclusion, the invention provides novel systems, devices, methods and arrangements for reducing low frequency loss in a data detection system. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the system comprising:
    a preamplifier operable to receive an input signal derived from a storage medium, and amplify the input signal to generate an amplified signal;
    an analog to digital converter operable to convert the amplified signal to a corresponding digital signal;
    a data detector operable to provide a detected data output based at least in part on a detector input derived from the digital signal, and wherein the detected data output represents the input signal;
    a baseline compensation module, wherein the baseline compensation module includes:
        an accumulator circuit operable to accumulate a difference between the detector input and the detected data output, and
        a calculation circuit operable to calculate a compensation factor based on the accumulated difference; and
    a summation element operable to aggregate the compensation factor with the amplified signal.

2. The system of claim 1, wherein the digital signal is filtered using a digital finite impulse response filter to yield the detector input.

3. The system of claim 1, wherein the accumulated difference is accumulated by dividing the difference for each respective bit period by the detected data output for the respective bit period to yield a product of the division, and adding the product of the division across a number of bit periods.

4. The system of claim 3, wherein the number of bit periods corresponds to the number of bit periods of a sector of the storage medium.

5. The system of claim 1, wherein the baseline compensation module includes a variable q low pass filter.

6. The system of claim 1, wherein the accumulated difference is accumulated by multiplying the difference for each respective bit period by the sign of the detected data output for the respective bit period to yield a product of the multiplication, and adding the product of the multiplication across a number of bit periods.

7. The system of claim 6, wherein the accumulated difference does not include the product of the multiplication where the magnitude of the detected data output is less than a threshold value for a respective bit period.

8. The system of claim 1, wherein the baseline compensation module includes a digital to analog converter.

9. A method for performing a baseline compensation, the method comprising:
- receiving a first analog input signal, wherein the first analog input signal corresponds to a second analog input signal that has been high pass filtered;
- converting the first analog input signal to a digital signal;
- performing a data detection on the digital signal to provide a detected data output;
- calculating a difference between the digital signal and the detected data output;
- aggregating the difference with an accumulated difference to create a difference accumulation; and
- modifying a pole of a low pass filter using the difference accumulation.

10. The method of claim 9, wherein the method further comprises:
- aggregating an output derived from the low pass filter with the first analog input, wherein low frequency energy removed from the first analog input is restored.

11. The method of claim 9, wherein the difference is calculated by subtracting the digital signal from the detected data output and dividing the result by the detected data output.

12. The method of claim 9, wherein the difference is calculated by subtracting the digital signal from the detected data output and multiplying the result by the sign detected data output.

13. The method of claim 9, wherein the difference is calculated by subtracting the digital signal from the detected data output and multiplying the result by the sign detected data output for bit periods where the magnitude of the detected data output exceeds a threshold.

14. The method of claim 9, wherein the difference accumulation is multiplied by a damping factor to create a damped difference factor, and modifying the pole of the low pass filter is done using the damped difference factor.

15. A data processing circuit, wherein the circuit comprises:
- an input circuit operable to receive a first data input and provide a second data input, wherein the input circuit excludes low frequency energy exhibited in the first data input from the second data input;
- a processing circuit operable to generate a representation of the second data input;
- a data detection circuit operable to generate a representation of the first data input based at least in part on the representation of the second data input; and
- a baseline compensation circuit including:
  - an accumulator circuit operable to calculate an accumulated difference between the representation of the first data input and the representation of the second data input across a number of bit periods, and
  - a calculation circuit operable to calculate a compensation factor based at least in part on the accumulated difference.

16. The circuit of claim 15, wherein the input circuit is a preamplifier, and wherein the first data input is derived from a magnetic storage medium.

17. The circuit of claim 15, wherein the accumulated difference is accumulated by dividing the difference for each respective bit period divided by the representation of the first data input for the respective bit period to yield a product of the division, and adding the product of the division across a number of bit periods.

18. The circuit of claim 15, wherein the accumulated difference is accumulated by multiplying the difference for each respective bit period by the sign of the detected data output for the respective bit period to yield a product of the multiplication, and adding the product of the multiplication across the number of bit periods.

19. The circuit of claim 18, wherein the accumulated difference does not include the product of the multiplication where the magnitude of the detected data output is less than a threshold value for a respective bit period.

20. The circuit of claim 15, wherein the baseline compensation module includes a digital to analog converter.

* * * * *